United States Patent
Dunham et al.

(10) Patent No.: US 10,394,571 B2
(45) Date of Patent: Aug. 27, 2019

(54) PASSING DATA FROM A HOST-BASED UTILITY TO A SERVICE PROCESSOR

(71) Applicant: Lenovo Enterprise Solutions (Singapore) Pte. Ltd., Singapore (SG)

(72) Inventors: Scott N. Dunham, Apex, NC (US); Sumeet Kochar, Cary, NC (US)

(73) Assignee: Lenovo Enterprise Solutions (Singapore) Pte. Ltd., Singapore (SG)

(*) Notice: Subject to any disclaimer, the term of this patent is extended or adjusted under 35 U.S.C. 154(b) by 262 days.

(21) Appl. No.: 15/370,427

(22) Filed: Dec. 6, 2016

(65) Prior Publication Data

US 2018/0157494 A1 Jun. 7, 2018

(51) Int. Cl.
| | |
|---|---|
| *G06F 9/4401* | (2018.01) |
| *G06F 3/06* | (2006.01) |
| *G06F 13/24* | (2006.01) |
| *G06F 8/65* | (2018.01) |

(52) U.S. Cl.
CPC .......... *G06F 9/4401* (2013.01); *G06F 3/0611* (2013.01); *G06F 3/0635* (2013.01); *G06F 3/0673* (2013.01); *G06F 13/24* (2013.01); *G06F 8/65* (2013.01)

(58) Field of Classification Search
CPC .............................. G06F 9/4401; G06F 13/24
See application file for complete search history.

(56) References Cited

U.S. PATENT DOCUMENTS

| | | | | |
|---|---|---|---|---|
| 8,578,080 | B2 * | 11/2013 | Sahita | G06F 13/24 710/260 |
| 9,176,752 | B1 * | 11/2015 | Marr | G06F 9/4411 |
| 2013/0046904 | A1 * | 2/2013 | Hilland | H04L 67/125 709/250 |
| 2013/0151841 | A1 * | 6/2013 | McGraw | G06F 11/3006 713/100 |
| 2017/0090896 | A1 * | 3/2017 | Lin | G06F 8/61 |

* cited by examiner

*Primary Examiner* — Farley Abad
(74) *Attorney, Agent, or Firm* — Jeffrey L. Streets

(57) ABSTRACT

A system and method are provided for passing a data file from a software utility to a service processor. The method includes loading, using a processor, an interrupt handler and runtime code during initialization of a computer before booting an operating system; requesting, using a processor, that the operating system transfer a data file via an interface; and transferring, using a processor, the data file to an area accessible to the runtime code. The method further includes requesting, using a processor, that the interrupt handler pass the data file to a service processor. Still further, the method includes passing, using a processor, the data file from the accessible area to the service processor via a memory-mapped input/output window of the service processor, wherein the data file is transferred to the service processor without waiting for a system reboot.

20 Claims, 4 Drawing Sheets

PASSING DATA FROM A HOST-BASED UTILITY TO A SERVICE PROCESSOR

BACKGROUND

The present disclosure relates to methods of transferring a data file to a service processor.

BACKGROUND OF THE RELATED ART

Interaction between host-based utilities and a baseboard management controller may be restricted by a user's disablement of certain features. For example, a common path for a host-based utility to pass files to a baseboard management controller is through a LAN over USB connection. However, some users disable the LAN over USB pathway based on the concern that this path may not be secure.

Interaction between host-based utilities and a baseboard management controller might also be restricted by throughput limitations. For example, another path to pass files from a host-based utility to the baseboard management controller is the Intelligent Platform Management Interface (IPMI) path using a keyboard controller style interface. However, this path is notoriously slow and is of limited usefulness, especially if a large amount of data is being passed. Yet another path for passing files from a host-based utility to the baseboard management controller involves delaying the actual transfer of the file until a subsequent reboot of the system.

BRIEF SUMMARY

One embodiment provides a method comprising loading, using a processor, an interrupt handler and runtime code during initialization of a computer before booting an operating system; requesting, using a processor, that the operating system transfer a data file via an interface; and transferring, using a processor, the data file to an area accessible to the runtime code. The method further comprises requesting, using a processor, that the interrupt handler pass the data file to a service processor. Still further, the method comprises passing, using a processor, the data file from the accessible area to the service processor via a memory-mapped input/output window of the service processor, wherein the data file is transferred to the service processor without waiting for a system reboot.

Another embodiment provides a computer program product comprising computer readable storage media that is not a transitory signal having program instructions embodied therewith, the program instructions executable by a processor to perform a method. The method comprises loading, using a processor, an interrupt handler and runtime code during initialization of a computer before booting an operating system; requesting, using a processor, that the operating system transfer a data file via an interface; and transferring, using a processor, the data file to an area accessible to the runtime code. The method further comprises requesting, using a processor, that the interrupt handler pass the data file to a service processor. Still further, the method comprises passing, using a processor, the data file from the accessible area to the service processor via a memory-mapped input/output window of the service processor, wherein the data file is transferred to the service processor without waiting for a system reboot.

Yet another embodiment provides a computer system comprising at least one storage device for storing program instructions, and at least one processor for processing the program instructions to: load an interrupt handler and runtime code during initialization of a computer before booting an operating system; request that the operating system transfer a data file via an interface; transfer the data file to an area accessible to the runtime code; request that the interrupt handler pass the data file to a service processor; and pass the data file from the accessible area to the service processor via a memory-mapped input/output window of the service processor, wherein the data file is transferred to the service processor without waiting for a system reboot.

DETAILED DESCRIPTION

Figure 1:
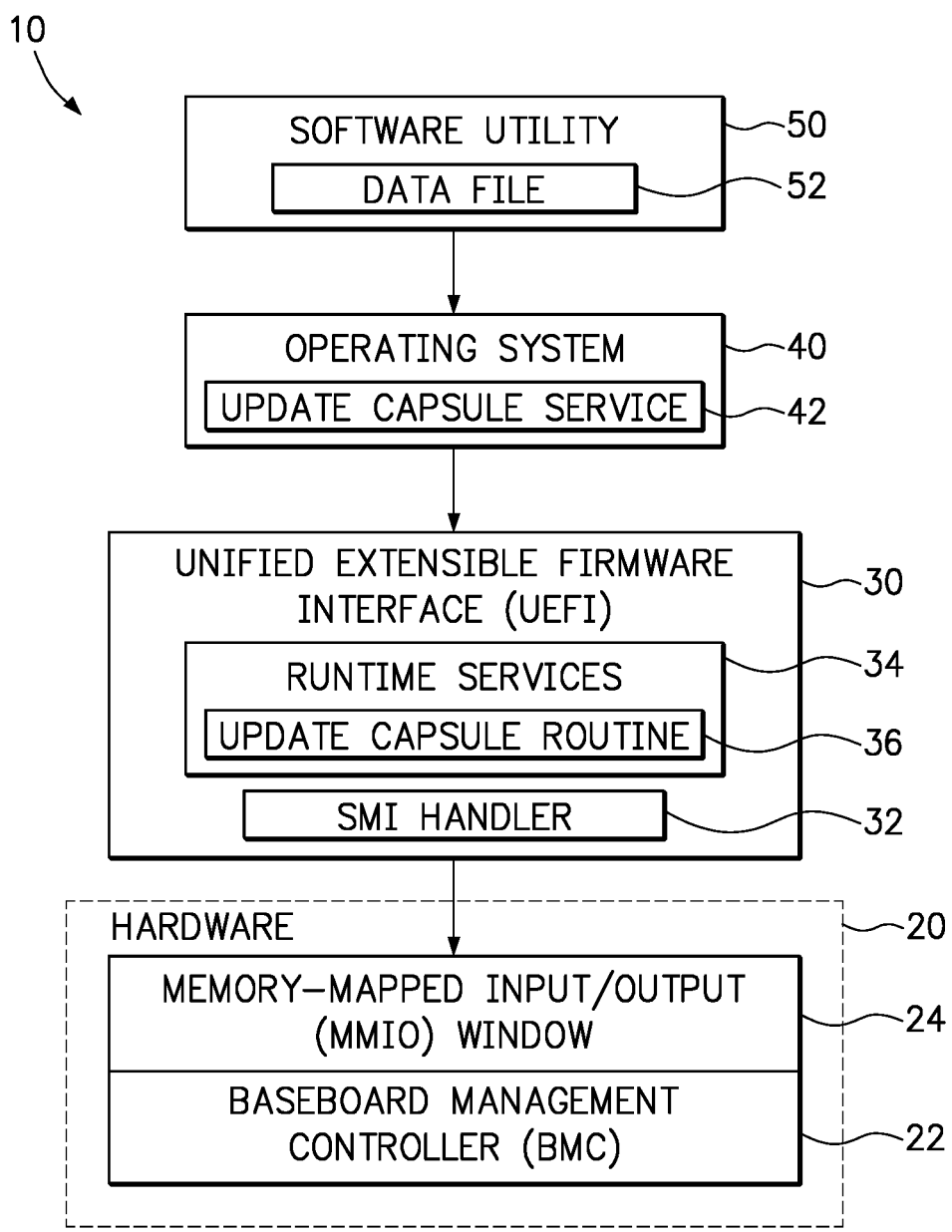
FIG. 1 is a diagram of a software stack according to one embodiment.

One embodiment provides a method comprising loading, using a processor, an interrupt handler and runtime code during initialization of a computer before booting an operating system; requesting, using a processor, that the operating system transfer a data file via an interface; and transferring, using a processor, the data file to an area accessible to the runtime code. The method further comprises requesting, using a processor, that the interrupt handler pass the data file to a service processor. Still further, the method comprises passing, using a processor, the data file from the accessible area to the service processor via a memory-mapped input/output window of the service processor, wherein the data file is transferred to the service processor without waiting for a system reboot.

The firmware interface is a software interface between an operating system and the computer's hardware. A preferred firmware interface is a Unified Extensible Firmware Interface (UEFI), which is a specification managed by the Unified EFI Forum for implementing a firmware interface. A firmware interface will typically include both boot code that is only used during system boot and runtime codes that provides runtime services while the system is running. While the firmware interface may provide various runtime services, various embodiments may include runtime code that is an update capsule routine. The system management interrupt (SMI) handler code is also runtime code, which may be loaded into a protected region of memory.

In one embodiment, the operating system includes an update capsule service, and the firmware interface includes an update capsule routine. Accordingly, the operating system may transfer the data file to the firmware interface by causing the update capsule service to transfer the data file to the update capsule routine.

The computer includes a service processor that performs various out-of-band management functions. The service processor may be a baseboard management controller (BMC) or an integrated management module (IMM). In various embodiments, the service processor provides a memory-mapped input/output (MMIO) window that enables the operating system to pass data to the service processor. The servicer processor preferably provides MMIO that is dual-ported to provide an MMIO window to the in-band host environment and to the out-of-band BMC environment.

Embodiments of the present method may be adapted to implement a firmware update to one or more devices of the computer. For example, the utility may be a firmware update utility, and the data file may be a firmware update. By passing the data file (firmware update) from the software utility to the service processor as described above, the service processor may then update firmware of a device of the computer through an out-of-band connection between the service processor and the device without interfering with in-band communication between the operating system and the device.

Further embodiments of the present method may be adapted to implement enhanced system management or monitoring functions. For example, the data file may be a utility log, such as a device log collected by the utility monitoring the performance of one or more device of the computer. By passing the data file (utility log) from the software utility to the service processor as described above, the service processor may then make the utility log accessible to a user through systems management software. The systems management software may enable local or remote access to the utility log.

Another embodiment provides a computer program product comprising computer readable storage media that is not a transitory signal having program instructions embodied therewith, the program instructions executable by a processor to perform a method. The method comprises loading, using a processor, an interrupt handler and runtime code during initialization of a computer before booting an operating system; requesting, using a processor, that the operating system transfer a data file via an interface; and transferring, using a processor, the data file to an area accessible to the runtime code. The method further comprises requesting, using a processor, that the interrupt handler pass the data file to a service processor. Still further, the method comprises passing, using a processor, the data file from the accessible area to the service processor via a memory-mapped input/output window of the service processor, wherein the data file is transferred to the service processor without waiting for a system reboot.

The foregoing computer program products may further include program instructions for implementing or initiating any one or more aspects of the methods described herein. Accordingly, a separate description of the methods will not be duplicated in the context of a computer program product.

Yet another embodiment provides a computer system, comprising at least one storage device for storing program instructions, and at least one processor for processing the program instructions to: load an interrupt handler and runtime code during initialization of a computer before booting an operating system; request that the operating system transfer a data file via an interface; transfer the data file to an area accessible to the runtime code; request that the interrupt handler pass the data file to a service processor; and pass the data file from the accessible area to the service processor via a memory-mapped input/output window of the service processor, wherein the data file is transferred to the service processor without waiting for a system reboot. The foregoing system may further process the program instructions to implement or initiate any one or more aspects of the methods described herein.

FIG. 1 is a diagram of a software stack 10. When hardware 20 is powered on, the Unified Extensible Firmware Interface (UEFI) 30 runs various boot services, then initiates a System Management Interrupt (SMI) Handler 32 and various runtime services 34. After initiating the SMI Handler 32 and the runtime services 34, such as the update capsule routine 36, the UEFI 30 boots the operating system 40. In this example, the operating system 40 provides services to a software utility 50 that has a data file 52, such as a firmware update or a utility log.

The software utility 50 may call the update capsule service 42 of the operating system 40 and request transfer of the data file 52 to a service processor. Accordingly, the update capsule service 42 of the operating system 40 will forward the data file 52 to the update capsule routine 36 of the UEFI 30. The UEFI 30 then invokes the SMI Handler 32 and causes the SMI Handler 32 to pass the data file 52 on to the baseboard management controller (BMC) 22 via the memory-mapped input/output (MMIO) window 24. The BMC 22 may then use the data file 52 in appropriate manner, which may be encoded within the data file itself. For example, if the data file 52 is a firmware update, then the BMC 52 may install that firmware update of a corresponding device of the computer. The BMC 52 will preferably use proprietary methods or existing standard methods to communicate with the device in an out-of-band manner without interfering with the operating system's access to that device.

Figure 2:
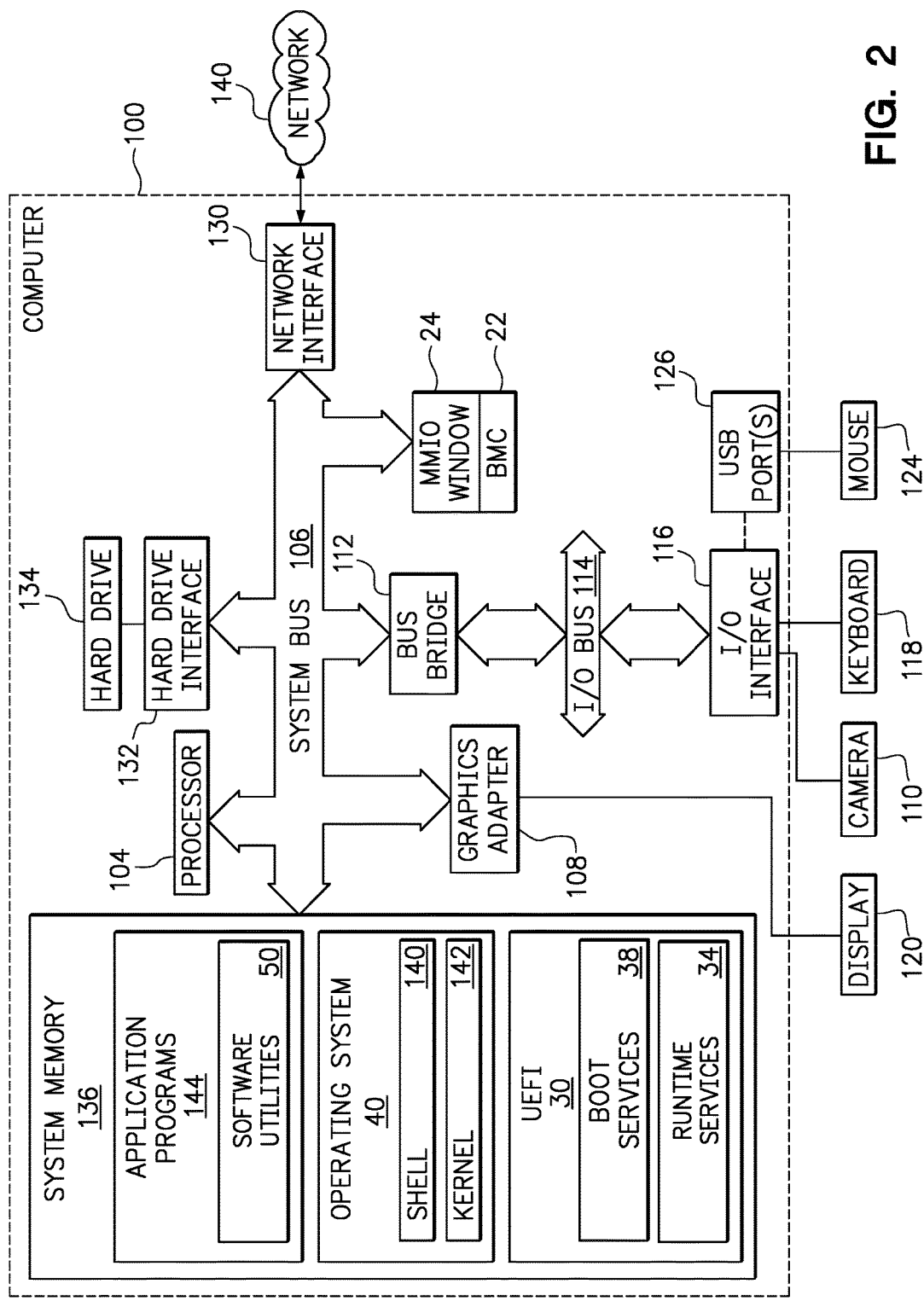
FIG. 2 is a diagram of a computer.

FIG. 2 is a diagram of a computer 100 according to one embodiment. The computer 100 includes a processor unit 104 that is coupled to a system bus 106. The processor unit 104 may utilize one or more processors, each of which has one or more processor cores. A graphics adapter 108, which drives/supports a display 120, is also coupled to system bus 106. The graphics adapter 108 may, for example, include a graphics processing unit (GPU). The system bus 106 is coupled via a bus bridge 112 to an input/output (I/O) bus 114. An I/O interface 116 is coupled to the I/O bus 114. The I/O interface 116 affords communication with various I/O devices, including a camera 110, a keyboard 118, and a USB mouse 124 via USB port(s) 126. As depicted, the computer 100 is able to communicate with other network devices over the network 140 using a network adapter or network interface controller 130.

A hard drive interface 132 is also coupled to the system bus 106. The hard drive interface 132 interfaces with a hard drive 134. In a preferred embodiment, the hard drive 134 communicates with system memory 136, which is also coupled to the system bus 106. System memory is defined as a lowest level of volatile memory in the computer 100. This volatile memory includes additional higher levels of volatile memory (not shown), including, but not limited to, cache memory, registers and buffers. Data that populates the system memory 136 includes the UEFI 30, the operating system (OS) 40 and the application programs 144. The UEFI 30 may include both boot services 38 and the runtime services 34.

The operating system 138 includes a shell 140 for providing transparent user access to resources such as application programs 144. Generally, the shell 140 is a program that provides an interpreter and an interface between the user and the operating system. More specifically, the shell 140 executes commands that are entered into a command line user interface or from a file. Thus, the shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while the shell 140 may be a text-based, line-oriented user interface, embodiments may support other user interface modes, such as graphical, voice, gestural, etc.

As depicted, the operating system 138 also includes the kernel 142, which includes lower levels of functionality for the operating system 138, including providing essential services required by other parts of the operating system 138 and application programs 144. Such essential services may include memory management, process and task management, disk management, and mouse and keyboard management. The operating system 138 may further include the update capsule server 42 shown in FIG. 1.

As shown, the computer 100 may also include application programs 144 in the system memory of the computer 100. Software utilities 50 may be including in the application programs 144 or may be part of the operating system 40.

The hardware elements depicted in the computer 100 are not intended to be exhaustive, but rather are representative. For instance, the computer 100 may include alternate memory storage devices such as magnetic cassettes, digital versatile disks (DVDs), Bernoulli cartridges, and the like. These and other variations are intended to be within the scope of the various embodiments.

Still further, the computer 100 includes a baseboard management controller 22 that is accessible to the operating system 40 via the MMIO window 24. Specifically, writing data to MMIO through the MMIO window 24 makes the data available to the BMC 22.

Figure 3:
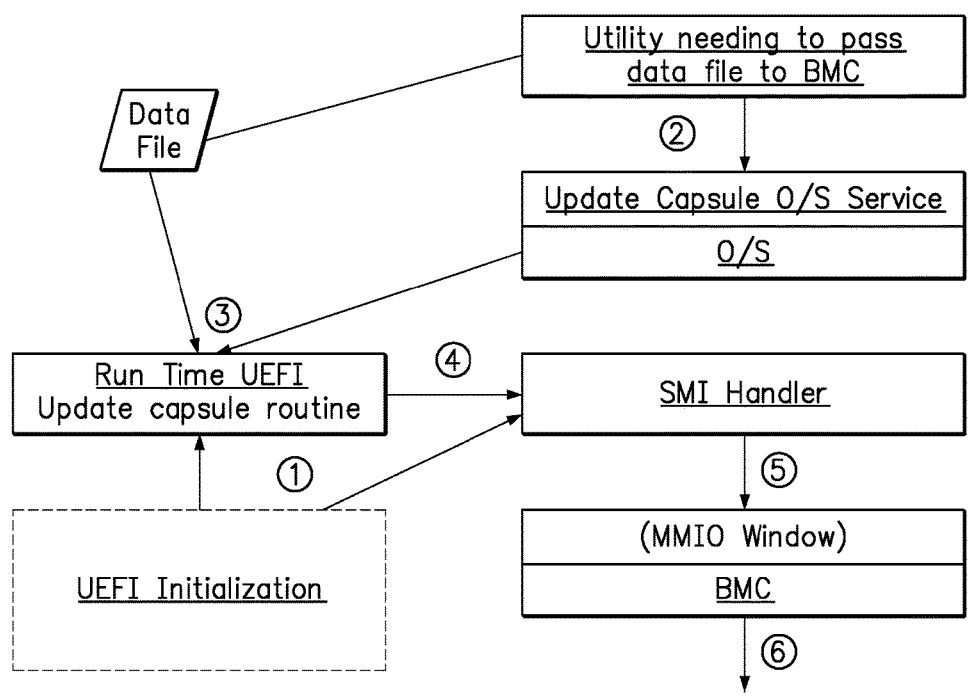
FIG. 3 is a diagram illustrating communications channels according to one embodiment

FIG. 3 is a diagram illustrating an embodiment of a method. As shown, the method may be described as including six steps 1-6. In step 1, the UEFI initialization loads an SMI handler and runtime UEFI code before the operating system is booted. In step 2, a utility with a desired data file calls the update capsule service of the operating system. In step 3, the update capsule service forwards the data file to the runtime UEFI code, such as an update capsule routine. Then, in step 4, the runtime UEFI code invokes the SMI handler. In step 5, the SMI handler passes the data file to the BMC via a BMC MMIO access window. In step 6, the BMC may use the data file for appropriate purpose, which may be encoded in a header of the data file.

Figure 4:
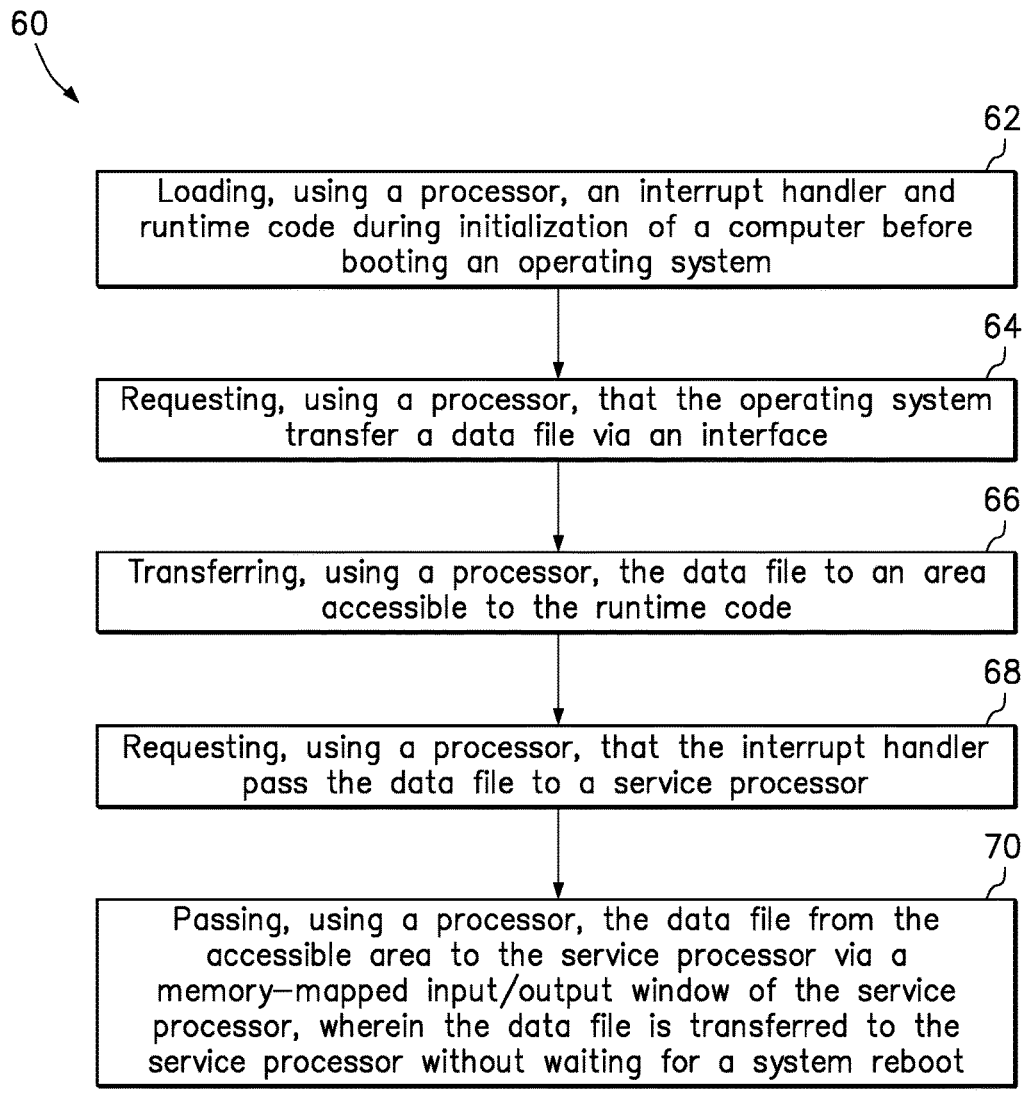
FIG. 4 is a flowchart of a method.

FIG. 4 is a flowchart of a method 60. Step 62 includes loading, using a processor, an interrupt handler and runtime code during initialization of a computer before booting an operating system. Step 64 includes requesting, using a processor, that the operating system transfer a data file via an interface. Step 66 includes transferring, using a processor, the data file to an area accessible to the runtime code. Step 68 includes requesting, using a processor, that the interrupt handler pass the data file to a service processor. Then, step 70 includes passing, using a processor, the data file from the accessible area to the service processor via a memory-mapped input/output window of the service processor, wherein the data file is transferred to the service processor without waiting for a system reboot.

As will be appreciated by one skilled in the art, embodiments may take the form of a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. Furthermore, any program instruction or code that is embodied on such computer readable storage media (including forms referred to as volatile memory) that is not a transitory signal are, for the avoidance of doubt, considered "non-transitory".

Program code embodied on a computer readable storage medium may be transmitted using any appropriate medium, including but not limited to wireless, wireline, optical fiber cable, RF, etc., or any suitable combination of the foregoing. Computer program code for carrying out various operations may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments may be described with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored on computer readable storage media is not a transitory signal, such that the program instructions can direct a computer, other programmable data processing apparatus, or other devices to function in a particular manner, and such that the program instructions stored in the computer readable storage medium produce an article of manufacture.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to limit the scope of the claims. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the embodiment.

The corresponding structures, materials, acts, and equivalents of all means or steps plus function elements in the claims below are intended to include any structure, material, or act for performing the function in combination with other claimed elements as specifically claimed. Embodiments have been presented for purposes of illustration and description, but it is not intended to be exhaustive or limited to the embodiments in the form disclosed. Many modifications and variations will be apparent to those of ordinary skill in the art after reading this disclosure. The disclosed embodiments were chosen and described as non-limiting examples to enable others of ordinary skill in the art to understand these embodiments and other embodiments involving modifications suited to a particular implementation.

What is claimed is:

1. A method, comprising:
    loading, using a processor, an interrupt handler and runtime code during initialization of a computer before booting an operating system;
    requesting, using a processor, that the operating system transfer a data file via an interface;
    transferring, using a processor, the data file to an area accessible to the runtime code;
    requesting, using a processor, that the interrupt handler pass the data file to a service processor; and
    passing, using a processor, the data file from the accessible area to the service processor via a memory-mapped input/output window of the service processor, wherein the data file is transferred to the service processor without waiting for a system reboot.

2. The method of claim 1, wherein the interrupt handler and runtime code are caused to be loaded by a firmware interface.

3. The method of claim 1, wherein the data file transfer is requested by a utility, and wherein the data file is transferred to the accessible area by the operating system.

4. The method of claim 1, wherein the passing of the data file to the service processor is requested by the runtime code, and wherein the data file is passed to the service processor by the interrupt handler.

5. The method of claim 1, wherein the service processor provides a memory-mapped input-output window including a first port accessible to the processor and a second port accessible to the service processor.

6. The method of claim 3, wherein the data file is a firmware update and the utility is a firmware update utility.

7. The method of claim 6, further comprising:
    the service processor using the data file to update firmware of a device of the computer through an out-of-band connection between the service processor and the device without interfering with in-band communication between the operating system and the device.

8. The method of claim 1, wherein the data file is a utility log and the utility log is a device log.

9. The method of claim 8, further comprising:
    the service processor making the utility log accessible to a user through systems management software.

10. The method of claim 1, wherein the interrupt handler is loaded into a protected region of memory.

11. A computer program product comprising computer readable storage media that is not a transitory signal having program instructions embodied therewith, the program instructions executable by a processor to perform a method comprising:
    loading, using a processor, an interrupt handler and runtime code during initialization of a computer before booting an operating system;
    requesting, using a processor, that the operating system transfer a data file via an interface;
    transferring, using a processor, the data file to an area accessible to the runtime code;
    requesting, using a processor, that the interrupt handler pass the data file to a service processor; and
    passing, using a processor, the data file from the accessible area to the service processor via a memory-mapped input/output window of the service processor, wherein the data file is transferred to the service processor without waiting for a system reboot.

12. The computer program product of claim 11, wherein the operating system includes an update capsule service, wherein the interface includes an update capsule routine, and wherein the operating system transfers the data file to the interface by the update capsule service transferring the data file to the update capsule routine.

13. The computer program product of claim 11, wherein the interface is a Unified Extensible Firmware Interface.

14. The computer program product of claim 13, wherein the runtime code is an Update Capsule routine.

15. The computer program product of claim 11, wherein the data file is a firmware update and the data transfer is requested by a firmware update utility.

16. The computer program product of claim 15, the method further comprising:
    the service processor updating firmware of a device of the computer through an out-of-band connection between the service processor and the device without interfering with in-band communication between the operating system and the device.

17. The computer program product of claim 11, the method further comprising:
the service processor making the data file accessible to a user through systems management software, wherein the data file is a utility log.

18. A computer system, comprising:
at least one storage device for storing program instructions; and
at least one processor for processing the program instructions to:
load an interrupt handler and runtime code during initialization of a computer before booting an operating system;
request that the operating system transfer a data file via an interface;
transfer the data file to an area accessible to the runtime code;
request that the interrupt handler pass the data file to a service processor; and
pass the data file from the accessible area to the service processor via a memory-mapped input/output window of the service processor, wherein the data file is transferred to the service processor without waiting for a system reboot.

19. The computer system of claim 18, wherein the data file is a firmware update and the data transfer is requested by a firmware update utility, and wherein the program instructions are further processed to use the data file to update firmware of a device of the computer through an out-of-band connection between the service processor and the device without interfering with in-band communication between the operating system and the device.

20. The computer system of claim 18, wherein the service processor is selected from a baseboard management controller and an integrated management module.

* * * * *